(12) United States Patent
Jung et al.

(10) Patent No.: US 11,009,461 B2
(45) Date of Patent: May 18, 2021

(54) DEFECT INVESTIGATION DEVICE SIMULTANEOUSLY DETECTING PHOTOLUMINESCENCE AND SCATTERED LIGHT

(71) Applicant: ETAMAX CO., LTD, Suwon-si (KR)

(72) Inventors: Huyndon Jung, Suwon-si (KR);
Youngbeom Kim, Suwon-si (KR)

(73) Assignee: ETAMAX CO., LTD, Suwon-si (KR)

( * ) Notice: Subject to any disclaimer, the term of this patent is extended or adjusted under 35 U.S.C. 154(b) by 170 days.

(21) Appl. No.: 16/463,794

(22) PCT Filed: Nov. 22, 2017

(86) PCT No.: PCT/KR2017/013356
§ 371 (c)(1),
(2) Date: May 23, 2019

(87) PCT Pub. No.: WO2018/117440
PCT Pub. Date: Jun. 28, 2018

(65) Prior Publication Data
US 2019/0302025 A1    Oct. 3, 2019

(30) Foreign Application Priority Data

Dec. 22, 2016 (KR) .......................... 10-2016-0176593

(51) Int. Cl.
*G01N 21/64* (2006.01)
*G01N 21/88* (2006.01)
*G01N 27/10* (2006.01)

(52) U.S. Cl.
CPC ..... *G01N 21/6456* (2013.01); *G01N 21/6489* (2013.01); *G01N 21/8806* (2013.01); *G01N 27/10* (2013.01); *G01N 2021/6495* (2013.01); *G01N 2021/8845* (2013.01);
(Continued)

(58) Field of Classification Search
None
See application file for complete search history.

(56) References Cited

U.S. PATENT DOCUMENTS 9,163,987 B2 * 10/2015 Sappey ................ G01J 3/4412

FOREIGN PATENT DOCUMENTS

| JP | 2007-318031 A | 12/2007 |
|---|---|---|
| JP | 2015-119056 A | 6/2015 |
| JP | 2016-197079 A | 11/2016 |

(Continued)

OTHER PUBLICATIONS

International Search Report of PCT Application No. PCT/KR2017/013356, which is parent—4 pages (dated Feb. 26, 2018).

*Primary Examiner* — David P Porta
*Assistant Examiner* — Meenakshi S Sahu
(74) *Attorney, Agent, or Firm* — Knobbe Martens Olson & Bear LLP

(57) ABSTRACT

The present disclosure relates to a substrate defect measuring apparatus for detecting defects inside a substrate by photoluminescence and detecting defects outside the substrate by using the scattering of incident light for generating photoluminescence, and provides an apparatus for constituting an optical system in order to measure scattered and/or reflected light together in a procedure of measuring the photoluminescence, thereby shortening a measurement time.

20 Claims, 5 Drawing Sheets

(52) U.S. Cl.
CPC ........... *G01N 2201/0636* (2013.01); *G01N 2201/0662* (2013.01); *G01N 2201/06113* (2013.01)

(56) References Cited

FOREIGN PATENT DOCUMENTS

| KR | 10-2014-0139559 A | 12/2014 |
| KR | 10-2016-0024968 A | 3/2016 |

\* cited by examiner

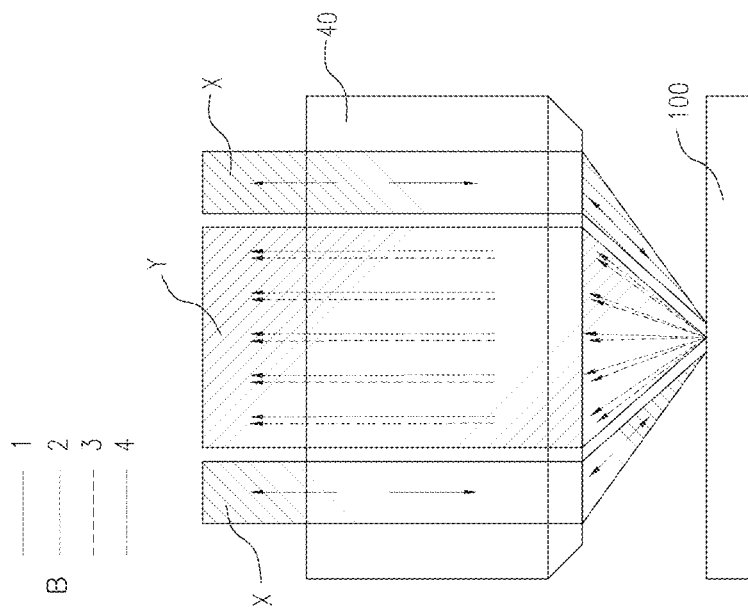
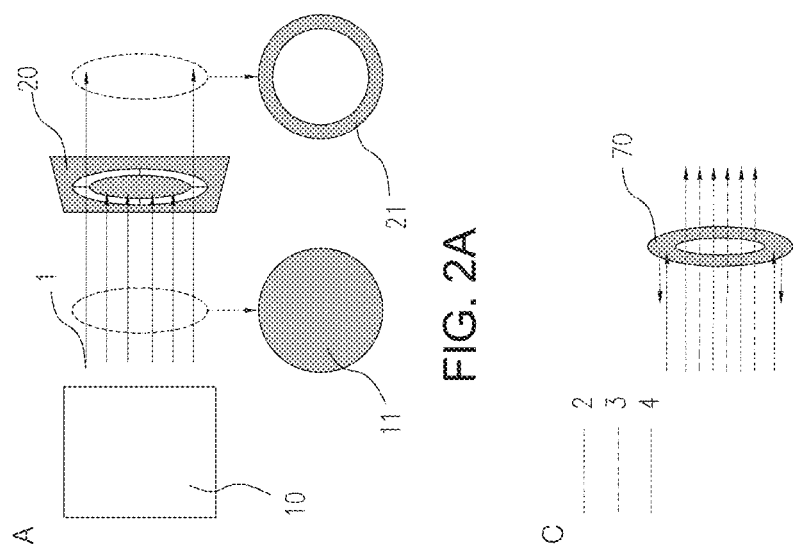
FIG. 2A
FIG. 2B
FIG. 2C

DEFECT INVESTIGATION DEVICE SIMULTANEOUSLY DETECTING PHOTOLUMINESCENCE AND SCATTERED LIGHT

TECHNICAL FIELD

The present disclosure relates to a substrate defect measuring apparatus using photoluminescence, and more particularly, to a substrate defect measuring apparatus for detecting defects inside a substrate by photoluminescence, and detecting defects outside the substrate by using the scattering of incident light for generating the photoluminescence.

BACKGROUND ART

Photoluminescence is generated in a procedure in which electrons return to a valence band when the electrons are excited from the valence band to a conduction band by applying the energy greater than the band gap of a sample material observed by light. The photoluminescence is a useful method for non-destructively analyzing the physical property of semiconductors, etc. because it does not cause special treatment or damage to the sample because of irradiating light to the sample.

When there are defects such as mixed impurities in the sample material, the energy level can be formed in the band gap, such that when the electrons are excited, they can be excited to the energy level of the impurity positioned below the conduction band, the electrons excited to the conduction band can also be lowered to the energy level of the impurity that is present in the valence band, and can also be lowered from the energy level of the impurity having high energy to the energy level of the impurity having low energy. Therefore, it is possible to observe the luminescence of the energy corresponding to the recombination procedure of various energy levels of the raw material and the impurity upon the photoluminescence analysis.

As the defects of the semiconductor substrate or the device, there are not only the defects formed therein but also the defects accumulated in the outside, such that the photoluminescence can all observe both defects, but it is necessary to confirm by distinguishing the defects formed in the outside from the internal defects. If the size of the external defect is observable by the resolution of light, it can be inspected by observing the reflection or the scattering of the incident light. Therefore, there is a growing need to simultaneously inspect the photoluminescence and the reflection and/or the scattering, and there is a problem in that as the device is miniaturized, fine measurement is needed, thereby increasing a measurement time due to precision measurement. Korean Patent Laid-Open Publication No. 2016-0024968 relates to 'a system and a method for detecting defects of a sample and measuring photoluminescence', and discloses a technology for detecting defects of the photoluminescence or the scattering by collecting the radiation or the photoluminescence radiation that has been defectively scattered from the sample and separating it into three. However, this technology has a disadvantage in that a vertical incident radiation source and an oblique incident radiation source are needed and a structure of the spectrometer becomes excessively complicated.

RELATED ART DOCUMENT

Patent Document (Patent Document 1) Korean Patent Laid-Open Publication No. 2016-0024968

DISCLOSURE

Technical Problem

The present disclosure is intended to solve the above problem, and an object of the present disclosure is to provide an apparatus for shortening a measurement time by constituting an optical system for measuring scattered and/or reflected light together in a procedure of measuring photoluminescence.

Technical Solution

The present disclosure provides, as a defect inspection apparatus for simultaneously detecting photoluminescence and scattered light, the apparatus including a light source for emitting ring-shaped light; a first beam splitter positioned on the traveling path of the ring-shaped light to change the path in the perpendicular direction so that the light travels toward a sample, and for straightly passing through the photoluminescence, the scattered light, and the ring-shaped reflected light that have been generated from the sample; an objective lens for focusing the ring-shaped light whose path has been changed in the first beam splitter to transmit it to the sample, and transmitting the photoluminescence, the scattered light, and the ring-shaped reflected light that have been generated from the sample to the first beam splitter in parallel light; a stage where the ring-shaped light that is incident by being focused by the objective lens can be mapped with the sample; a second beam splitter for straightly passing through some of the photoluminescence, the scattered light, and the ring-shaped reflected light that have been generated from the sample and have passed through the objective lens and the first beam splitter and changing the paths of the remainder except for the passed-through some in the perpendicular direction; an image detector for imaging the photoluminescence, the scattered light, and the ring-shaped reflected light that have passed through the second beam splitter straightly; a ring-shaped diaphragm for blocking the ring-shaped reflected light that has passed through by changing the path in the perpendicular direction in the second beam splitter; a dichroic mirror for changing the path of the photoluminescence that has passed through the diaphragm in the perpendicular direction, and passing through the scattered light; a photoluminescence detecting unit for detecting the photoluminescence reflected by the dichroic mirror; and a scattered light detecting unit for detecting the scattered light that has passed through the dichroic mirror.

In addition, the present disclosure provides, as a defect inspection apparatus for simultaneously detecting photoluminescence and scattered light, the apparatus including a light source for emitting ring-shaped light; a first beam splitter positioned on the traveling path of the ring-shaped light to change the path in the perpendicular direction so that the light travels toward a sample, and for straightly passing through the photoluminescence, the scattered light, and the ring-shaped reflected light that have been generated from the sample; an objective lens for focusing the ring-shaped light whose path has been changed in the first beam splitter to transmit it to the sample, and transmitting the photoluminescence, the scattered light, and the ring-shaped reflected light that have been generated from the sample to the first beam splitter in parallel light; a stage where the ring-shaped light that is incident by being focused by the objective lens can be mapped with the sample; a second beam splitter for straightly passing through some of the photoluminescence, the scattered light, and the ring-shaped reflected light that have been generated from the sample and have passed through the objective lens and the first beam splitter and changing the paths of the remainder except for the passed-through some in the perpendicular direction; an image detector for imaging the photoluminescence, the scattered light, and the ring-shaped reflected light that have passed through the second beam splitter straightly; an inclined ring-shaped diaphragm for reflecting the ring-shaped reflected light, which has passed through by changing the path in the perpendicular direction in the second beam splitter, in the perpendicular direction; a dichroic mirror for changing the path of the photoluminescence that has passed through the inclined ring-shaped diaphragm in the perpendicular direction, and passing through the scattered light; a reflected light detecting unit for detecting the reflected light reflected by the inclined ring-shaped diaphragm; a photoluminescence detecting unit for detecting the photoluminescence reflected by the dichroic mirror; and a scattered light detecting unit for detecting the scattered light having passed through the dichroic mirror.

In addition, the present disclosure provides the defect inspection apparatus for simultaneously detecting the photoluminescence and the scattered light, in which the light source generates the ring-shaped light by passing the parallel light through a concentric slit.

In addition, the present disclosure provides, as a defect inspection apparatus for simultaneously detecting photoluminescence and scattered light, the apparatus including a first light source for transmitting photoluminescence excitation light to a light source unit dichroic mirror; a second light source for transmitting a ring-shaped non-excitation light to the light source unit dichroic mirror in the direction perpendicular to the first light source; the light source unit dichroic mirror for passing through the excitation light straightly, changing the non-excitation light in the perpendicular direction in order to travel in the same direction as that of the excitation light to generate the excitation light and the non-excitation light together and transmitting them to a first beam splitter; the first beam splitter positioned on the traveling paths of the excitation light and the non-excitation light that are traveling together to change the paths in the perpendicular direction so that the excitation light and the non-excitation light travel toward a sample, and for straightly passing through the photoluminescence, the scattered light, and the reflected light that have been generated from the excitation light in the sample, and the scattered light and the ring-shaped reflected light that have been generated from the non-excitation light therein; an objective lens for focusing the excitation light and the non-excitation light whose paths have been changed in the first beam splitter to transmit them to the sample, and transmitting the photoluminescence, the scattered light, and the reflected light that have been generated from the excitation light in the sample, and the scattered light and the ring-shaped reflected light that have been generated from the non-excitation light therein to the first beam splitter; a stage where the excitation light and the non-excitation light that are incident by being focused by the objective lens can be mapped with the sample; a second beam splitter for straightly passing through some of the photoluminescence, the scattered light, and the reflected light that have been generated from the excitation light and the scattered light and the ring-shaped reflected light that have been generated from the non-excitation light, which have been generated from the sample and have passed through the objective lens and the first beam splitter, and changing the paths of the remainder except for the passed-through some in the perpendicular direction; an image detector for imaging the photoluminescence, the scattered light, and the reflected light that have been generated from the excitation light and the scattered light and the ring-shaped reflected light that have been generated from the non-excitation light, which have passed through the second beam splitter straightly; an optical filter for blocking the scattered light and the reflected light that have been generated from the excitation light and for passing through the photoluminescence that has been generated from the excitation light and the scattered light and the ring-shaped reflected light that have been generated from the non-excitation light among the light having passed through by changing the path in the perpendicular direction in the second beam splitter; an inclined ring-shaped diaphragm for reflecting the ring-shaped reflected light that has been generated from the non-excitation light having passed through the optical filter in the perpendicular direction; a dichroic mirror for changing the path of the photoluminescence that has been generated from the excitation light in the perpendicular direction, and passing through the scattered light that has been generated from the non-excitation light, which have passed through the inclined ring-shaped diaphragm; a reflected light detecting unit for detecting the ring-shaped reflected light that has been generated from the non-excitation light reflected by the inclined ring-shaped diaphragm; a photoluminescence detecting unit for detecting the photoluminescence that has been generated from the excitation light reflected by the dichroic mirror; and a scattered light detecting unit for detecting the scattered light that has been generated from the excitation light having passed through the dichroic mirror.

In addition, the present disclosure provides the defect inspection apparatus for simultaneously detecting the photoluminescence and the scattered light in which the reflected light detecting unit includes an optical filter, a lens, and a detector.

In addition, the present disclosure provides the defect inspection apparatus for simultaneously detecting the photoluminescence and the scattered light in which the photoluminescence detecting unit and the scattered light detecting unit include an optical filter and a detector, respectively.

In addition, the present disclosure provides the defect inspection apparatus for simultaneously detecting the photoluminescence and the scattered light in which the image detector further includes an optical system for imaging an image.

In addition, the present disclosure provides the defect inspection apparatus for simultaneously detecting the photoluminescence and the scattered light in which the second light source generates the ring-shaped light by passing the parallel light through a concentric slit.

In addition, the present disclosure provides the defect inspection apparatus for simultaneously detecting the photoluminescence and the scattered light in which the excitation light is laser light having a wavelength of 375 nm, the non-excitation light is laser light having a wavelength of 532 nm, and the sample is a blue LED substrate.

Advantageous Effects

It is possible for the defect inspection apparatus for simultaneously detecting the photoluminescence and the scattered light of the present disclosure to constitute the optical system capable of simultaneously measuring the scattered light and/or the reflected light while measuring the photoluminescence, thereby shortening the measurement time of the mapping data of the entire sample region.

DESCRIPTION OF DRAWINGS

FIG. 2A is an enlarged diagram of the portion A of FIG. 1, FIG. 2B is an enlarged diagram of the portion B thereof, and FIG. 2C is an enlarged diagram of the portion C thereof.

BEST MODE

Figure 1:
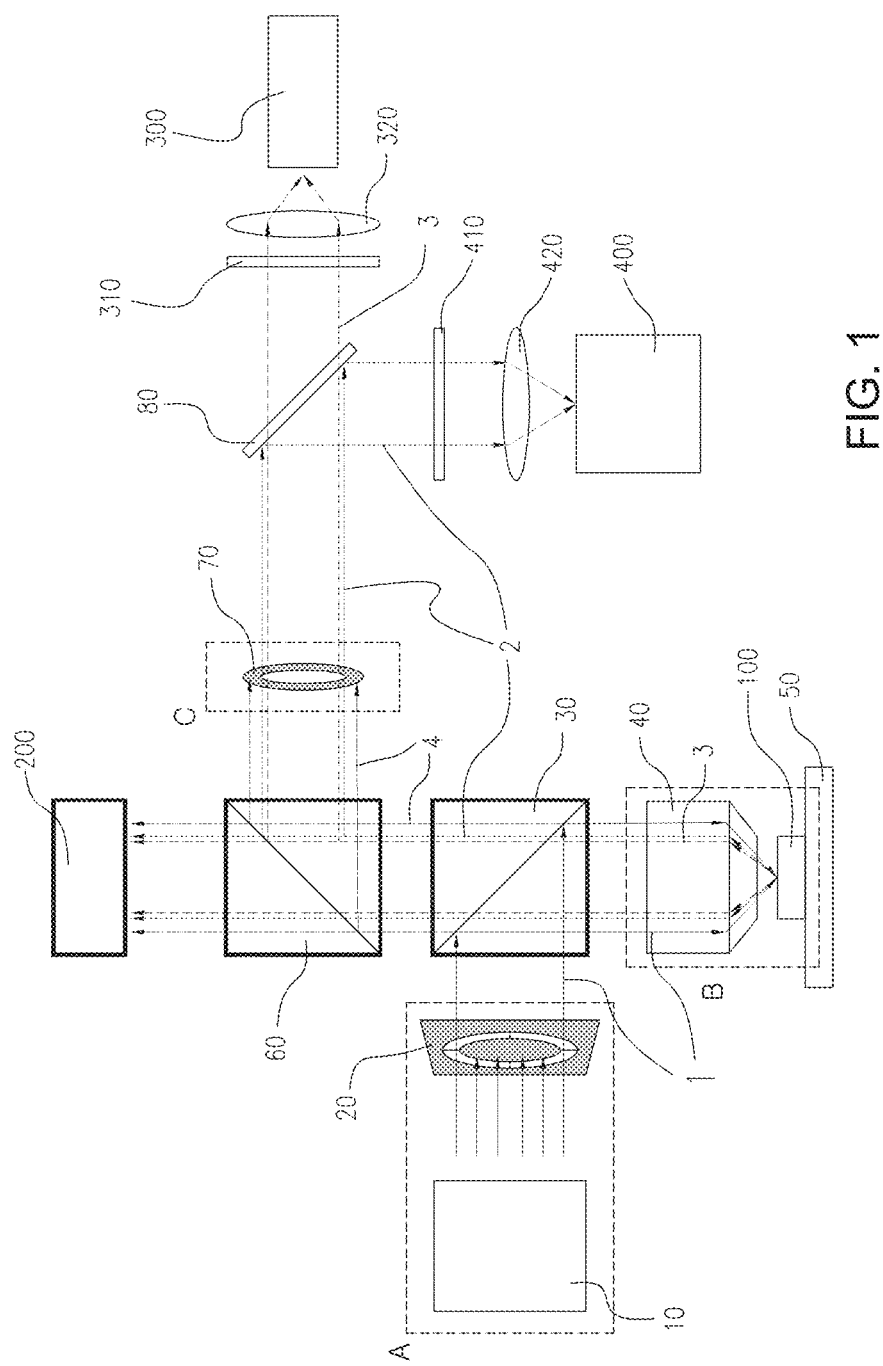
FIG. 1 is a conceptual diagram of an optical system for simultaneously measuring photoluminescence and scattered light using a single light source according to an embodiment of the present disclosure.

Prior to the detailed description of the present disclosure, terms or words used in the present specification and claims described below should not be construed as limited to ordinary or dictionary meaning. Therefore, the embodiments described in the present specification and the configurations illustrated in the drawings are merely the most preferred embodiment of the present disclosure and are not intended to represent all of the technical spirit of the present disclosure, such that it should be understood that various equivalents and deformed examples capable of replacing these at the time of filing the present disclosure can be present.

Hereinafter, preferred embodiments of the present disclosure will be described in detail with reference to the accompanying drawings so that those skilled in the art to which the present disclosure pertains can easily practice them. FIG. 1 is a conceptual diagram of an optical system for simultaneously measuring photoluminescence and scattered light using a single light source according to an embodiment of the present disclosure. In an embodiment of the present disclosure, a defect inspection apparatus for simultaneously detecting photoluminescence and scattered light includes a light source 10 having energy for emitting photoluminescence from a sample and emitting ring-shaped light 21. The light source can also emit by forming ring-shaped light 21 inside the light source, and also form the ring-shaped light 21 by passing circular parallel light 11 through a concentric slit 20.

The ring-shaped light 21 is incident into a first beam splitter 30 to change the path in the perpendicular direction, thereby traveling toward the sample. In an embodiment of the present disclosure, the ring-shaped light whose path has been changed in the beam splitter is focused while passing through an objective lens 40 and is directed to the sample. In an embodiment of the present disclosure, a sample stage 50, on which a sample 100 has been mounted so that the ring-shaped light incident by being focused from the objective lens can scan the surface of the sample, is mapped while moving in a back-forth and left-right (xy-scanning) or a planar spiral (r-θ scanning) in the vertical direction of the incident light 1. In an embodiment of the present disclosure, the incident light 1 is incident in the form of the ring-shaped light 21. In an embodiment of the present disclosure, the sample can be a semiconductor substrate, an LED substrate, or a device during a process or having completed a process. Photoluminescence 2, scattered light 3, and reflected light 4 are generated on the surface of the sample to be directed to the objective lens, and the reflected light has a ring shape that is a form of the incident light.

In an embodiment of the present disclosure, the objective lens converts the photoluminescence 2, the scattered light 3, and the ring-shaped reflected light 4 that have been generated from the sample into parallel light to transmit them to the first beam splitter 30. In an embodiment of the present disclosure, the objective lens is fixed and the sample is moved, such that the ring-shaped reflected light keeps the ring shape that was incident upon the exit of the objective lens. In an embodiment of the present disclosure, the photoluminescence, the scattered light, and the ring-shaped reflected light that have been generated from the sample become the parallel light after passing through the objective lens 40, thereby passing through the first beam splitter 30 straightly. In an embodiment of the present disclosure, the scattered light and the reflected light can travel in the parallel light through the entire surfaces of the objective lens 40 and the first beam splitter 30.

In an embodiment of the present disclosure, some of the photoluminescence 2, the scattered light 3, and the ring-shaped reflected light 4 that have been generated from the sample and have passed through the objective lens 40 and the first beam splitter 30 pass through a second beam splitter 60 straightly, and the paths of the remainder except for the passed-through some are changed in the perpendicular direction. In an embodiment of the present disclosure, the photoluminescence 2, the scattered light 3, and the ring-shaped reflected light 4 that have passed through the second beam splitter 60 straightly reach an image detector 200 for imaging them to form images. In an embodiment of the present disclosure, the image detector 200 further includes an optical system for imaging an image. In addition, the ring-shaped reflected light among the photoluminescence, the scattered light, and the ring-shaped reflected light that have passed through by changing the path in the perpendicular direction in the second beam splitter 60 is blocked by a ring-shaped diaphragm 70 positioned on the changed path.

The ring-shaped diaphragm 70 blocks only a part of the photoluminescence and the scattered light going straight to a position of the diaphragm together, but entirely blocks the ring-shaped reflected light.

In an embodiment of the present disclosure, a dichroic mirror 80 positioned on the paths where photoluminescence 2 and scattered light 3 having passed through the diaphragm travel can change the photoluminescence 2 in the perpendicular direction, and pass through the scattered light. The photoluminescence 2 reflected by the dichroic mirror 80 is detected by a photoluminescence detecting unit 400. In an embodiment of the present disclosure, the scattered light 3 having passed through the dichroic mirror is detected by a scattered light detecting unit 300. In an embodiment of the present disclosure, the photoluminescence detecting unit 400 includes a photoluminescence filter 410, a photoluminescence lens 420, and a photoluminescence detector (not illustrated). In addition, the scattered light detecting unit 300 includes a scattered light filter 310, a scattered light lens 320, and a scattered light detector (not illustrated).

FIG. 2A is an enlarged diagram of the portion A of FIG. 1, FIG. 2B is an enlarged diagram of the portion B thereof, and FIG. 2C is an enlarged diagram of the portion C thereof. In an embodiment of the present disclosure, the portion A includes a light source for generating the circular parallel light 11 and a concentric slit 20 for converting the circular parallel light into the ring-shaped light 21. The portion B has illustrated a configuration where the ring-shaped incident light 1 incident to the sample 100 by passing through the objective lens 40 is incident back to the objective lens in the ring-shaped reflected light 4, the photoluminescence 2, and the scattered light 3 and then changed to the parallel light to travel to the first beam splitter. The ring-shaped reflected light 4 shares a ring-shaped light path X together with the ring-shaped incident light 1. The photoluminescence 2 and the scattered light 3 form a meaningful path in a cylindrical light path Y inside the ring shape. Although the photoluminescence 2 and the scattered light 3 pass through the ring-shaped light path X, as illustrated in detail in the portion C, they are reflected together when the ring-shaped reflected light 4 is reflected (not illustrated). The portion C illustrates in detail a shape where the paths of the ring-shaped reflected light 4, the photoluminescence 2, and the scattered light 3 are changed in the perpendicular direction in the second beam splitter to pass through and then the ring-shaped reflected light is blocked by the ring-shaped diaphragm 70. In an embodiment of the present disclosure, the photoluminescence 2 and the scattered light 3 traveling from the ring-shaped diaphragm to the ring-shaped portion are also reflected together (not illustrated).

Figure 3:
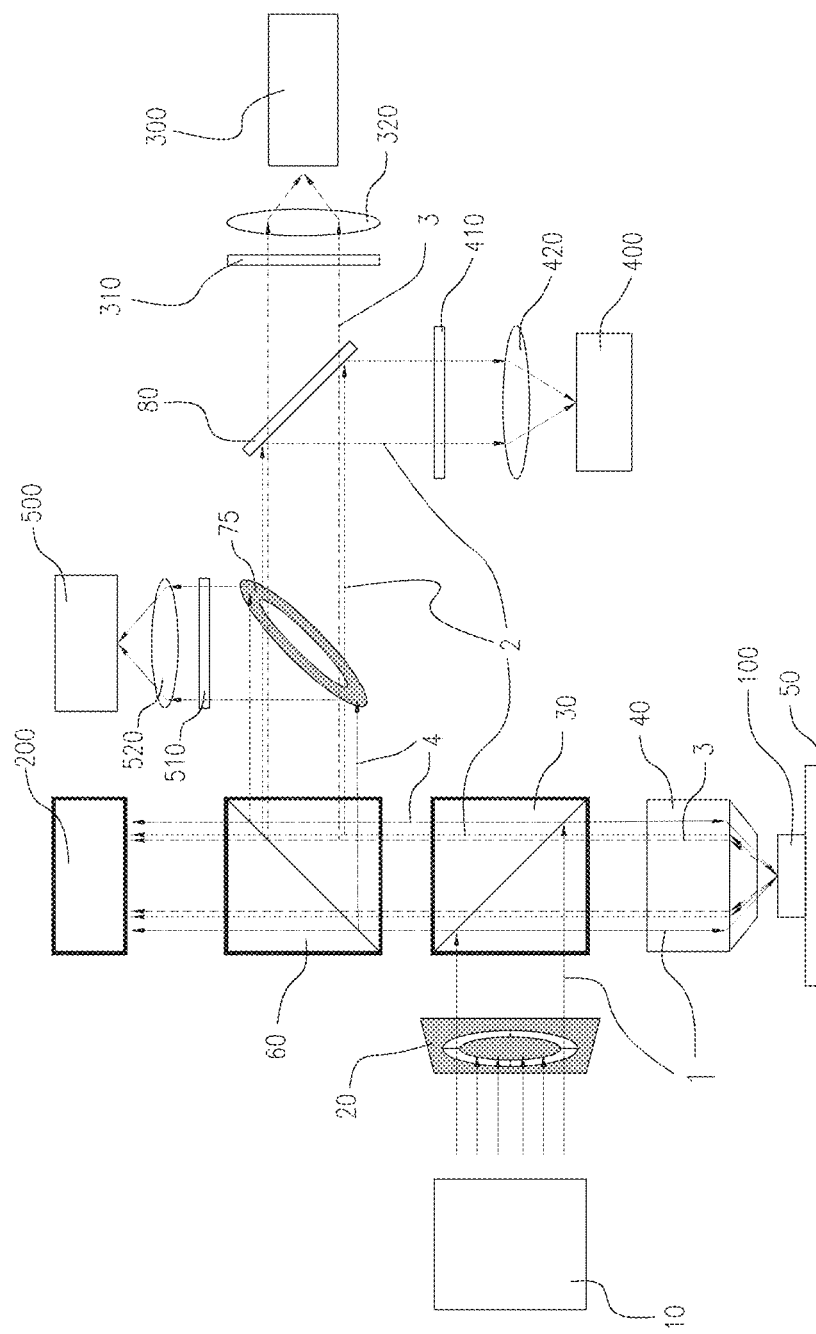
FIG. 3 is a conceptual diagram of an optical system for simultaneously measuring photoluminescence, scattered light, and reflected light using a single light source according to an embodiment of the present disclosure.

FIG. 3 is a conceptual diagram of an optical system for simultaneously measuring photoluminescence, scattered light, and reflected light using a single light source according to an embodiment of the present disclosure. In an embodiment of the present disclosure, the defect inspection apparatus for simultaneously detecting the photoluminescence, the scattered light, and the reflected light includes a light source for emitting the ring-shaped light 21 or a light source unit for generating ring-shaped light by emitting circular light and passing through the concentric slit 20; the first beam splitter 30 positioned on the traveling path of the ring-shaped light to change the path in the perpendicular direction so that the light become the incident light 1 traveling toward the sample 100, and for straightly passing through the photoluminescence 2, the scattered light 3, and the ring-shaped reflected light 4 that have been generated from the sample; the objective lens 40 for focusing the ring-shaped light 21 whose path has been changed in the beam splitter to transmit it to the sample as the incident light 1, and transmitting the photoluminescence 2, the scattered light 3, and the ring-shaped reflected light 4 that have been generated from the sample 100 to the first beam splitter 30 in the parallel light; a stage 50 where the ring-shaped light 21 that is the incident light 1 incident by being focused by the objective lens 40 can be mapped with the sample 100; the second beam splitter 60 for straightly passing through some of the photoluminescence 2, the scattered light 3, and the ring-shaped reflected light 4 that have been generated from the sample and have passed through the objective lens 40 and the first beam splitter 30 and changing the paths of the remainder except for the passed-through some in the perpendicular direction; the image detector 200 for imaging the photoluminescence 2, the scattered light 3, and the ring-shaped reflected light 4 that have passed through the second beam splitter 60 straightly; an inclined ring-shaped diaphragm 75 for reflecting the ring-shaped reflected light, which has passed through by changing the path in the perpendicular direction in the second beam splitter 60, in the perpendicular direction; the dichroic mirror 80 for changing the path of the photoluminescence 2 that has passed through the inclined ring-shaped diaphragm 75 in the perpendicular direction, and passing through the scattered light 3; a reflected light detecting unit 500 for detecting the ring-shaped reflected light 4 reflected by the inclined ring-shaped diaphragm 75; the photoluminescence detecting unit 400 for detecting the photoluminescence 2 reflected by the dichroic mirror 80; and the scattered light detecting unit 300 for detecting the scattered light 3 that has passed through the dichroic mirror 80. In an embodiment of the present disclosure, the image detector can further include an optical system for imaging an image.

In an embodiment of the present disclosure, the reflected light detecting unit of the defect inspection apparatus for simultaneously detecting the photoluminescence, the scattered light, and the reflected light can include an optical filter, a lens, and a detector, and the photoluminescence detecting unit and the scattered light detecting unit can include an optical filter and a detector, respectively.

Figure 4:
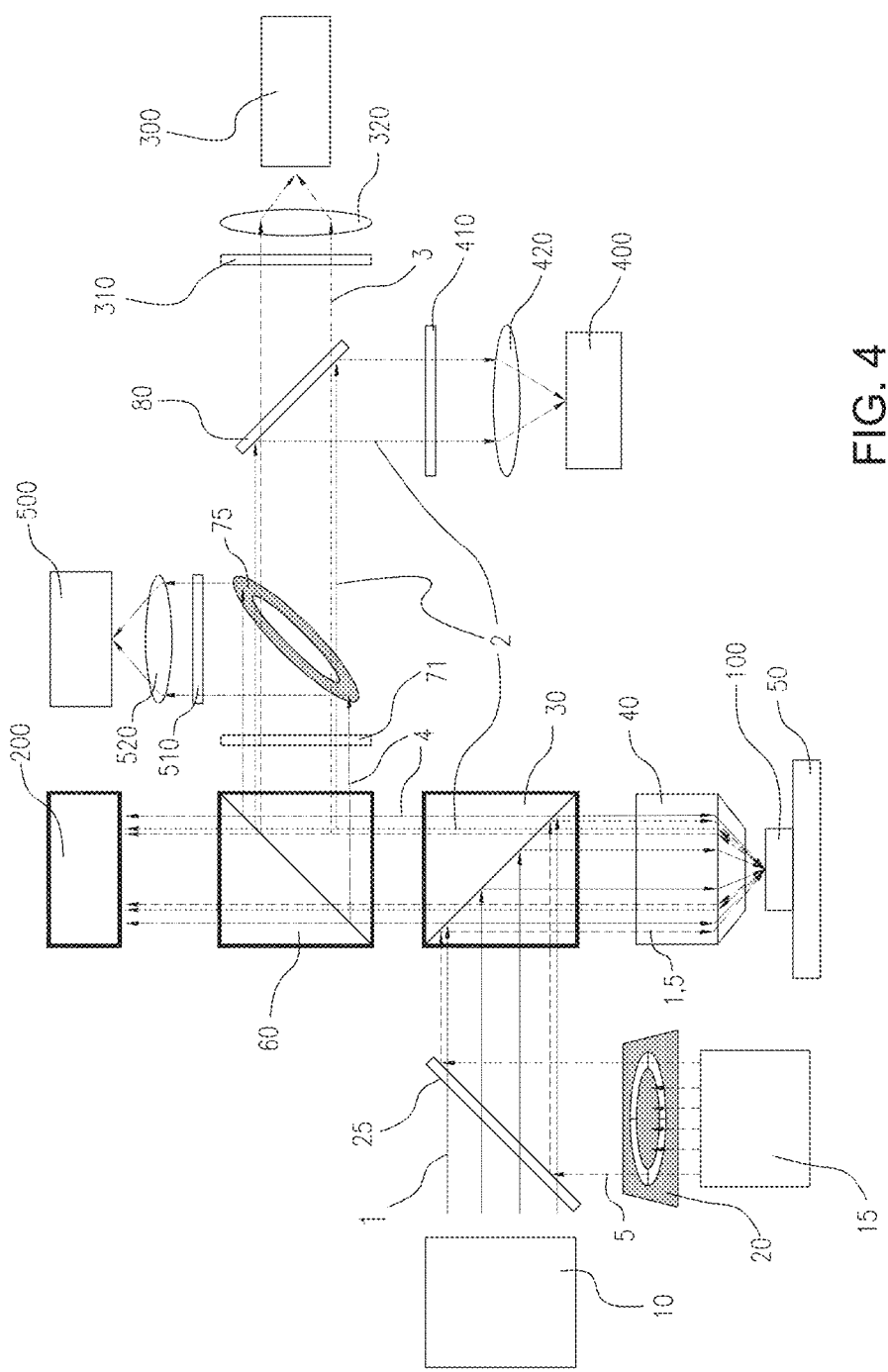
FIG. 4 is a conceptual diagram of an optical system for simultaneously measuring photoluminescence, scattered light, and reflected light using two different types of light sources according to an embodiment of the present disclosure.

FIG. 4 is a conceptual diagram of an optical system for simultaneously measuring photoluminescence, scattered light, and reflected light using two different types of light sources according to an embodiment of the present disclosure. In an embodiment of the present disclosure, an optical system for simultaneously measuring photoluminescence, scattered light, and reflected light by using two different types of light sources includes a first light source 10 for transmitting the excitation light 1 having the energy capable of exciting the photoluminescence from the sample 100 to a light source unit dichroic mirror 25; a second light source 15 for transmitting ring-shaped non-excitation light 5 having no energy capable of exciting the photoluminescence from the sample 100 to the light source unit dichroic mirror 25 in the direction perpendicular to the first light source; the light source unit dichroic mirror 25 for passing through the excitation light 1 straightly, changing the non-excitation light 5 in the perpendicular direction in order to travel in the same direction as that of the excitation light to generate the excitation light and the non-excitation light together as the incident lights 1, 5, and transmitting them to the first beam splitter 30; the first beam splitter 30 positioned on the traveling paths of the excitation light 1 and the non-excitation light 5 that are traveling together to change the paths in the perpendicular direction so that the excitation light and the non-excitation light travel toward the sample, and for straightly passing through the photoluminescence 2, the scattered light, and the reflected light that have been generated from the excitation light in the sample and the scattered light 3 and the ring-shaped reflected light 4 that have been generated from the non-excitation light therein; the objective lens 40 for focusing the excitation light 1 and the non-excitation light 5 whose paths have been changed in the first beam splitter 30 to transmit them to the sample 100 as the incident light, and transmitting the photoluminescence 2, the scattered light, and the reflected light that have been generated from the excitation light in the sample and the scattered light 3 and the ring-shaped reflected light 4 that have been generated from the non-excitation light therein to the first beam splitter; the stage 50 where the excitation light 1 and the non-excitation light 5 incident by being focused by the objective lens 40 can be mapped with the sample 100; the second beam splitter 60 for straightly passing through some of the photoluminescence 2, the scattered light, and the reflected light that have been generated from the excitation light that has been generated from the sample 100 and have passed through the objective lens 40 and the first beam splitter 30 and the scattered light 3 and the ring-shaped reflected light 4 that have been generated from the non-excitation light and changing the paths of the remainder except for the passed-through some in the perpendicular direction; the image detector 200 for imaging the photoluminescence, the scattered light, and the reflected light that have been generated from the excitation light having passed through the second beam splitter 60 straightly and the scattered light and the ring-shaped reflected light that have been generated from the non-excitation light; an optical filter 71 for blocking the scattered light and the reflected light that have been generated from the excitation light and for passing through the photoluminescence 2 that has been generated from the excitation light and the photoluminescence 2 that has been generated from the excitation light and the scattered light 3 and the ring-shaped reflected light 4 that have been generated from the non-excitation light among the light having passed through by changing the path in the perpendicular direction in the second beam splitter 60; the inclined ring-shaped diaphragm 75 for reflecting the ring-shaped reflected light 4 that has been generated from the non-excitation light having passed through the optical filter in the perpendicular direction; the dichroic mirror 80 for changing the path of the photoluminescence 2 that has been generated from the excitation light having passed through the inclined ring-shaped diaphragm 75 in the perpendicular direction, and passing through the scattered light 3 that has been generated from the non-excitation light; the reflected light detecting unit 500 for detecting the ring-shaped reflected light 4 that has been generated from the non-excitation light reflected by the ring-shaped diaphragm; the photoluminescence detecting unit 400 for detecting the photoluminescence 2 that has been generated from the excitation light reflected by the dichroic mirror 80; and the scattered light detecting unit 300 for detecting the scattered light 3 that has been generated from the excitation light having passed through the dichroic mirror 80.

In an embodiment of the present disclosure, the first beam splitter of the optical system for simultaneously measuring the photoluminescence, the scattered light, and the reflected light using two different types of light sources can be a dichroic mirror, and the image detector can further include an optical system for imaging an image. In addition, the second light source can emit the ring-shaped light, or can also emit the circular parallel light to pass it through the concentric slit, thereby generating the ring-shaped light. In an embodiment of the present disclosure, the reflected light detecting unit for detecting the ring-shaped reflected light of the optical system for simultaneously measuring the photoluminescence, the scattered light, and the reflected light using two different types of light sources includes an optical filter, a lens, and a detector, and the photoluminescence detecting unit and the scattered light detecting unit include an optical filter and a detector, respectively.

In an embodiment of the present disclosure, the sample of the optical system for simultaneously measuring the photoluminescence, the scattered light, and the reflected light using two different types of light sources can be a silicon substrate or an LED substrate for semiconductor. When the sample is an LED substrate, the wavelength of the excitation light and the wavelength of the non-excitation light can be adjusted to fit the LED emission wavelength. In an embodiment of the present disclosure, when the sample is a blue LED substrate, the excitation light can be laser light having a wavelength of 375 nm, and the non-excitation light can be laser light having a wavelength of 532 nm.

Figure 5A:
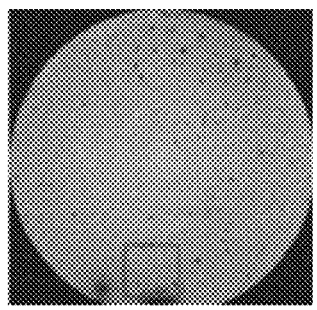
FIG. 5A is a diagram illustrating an image of the photoluminescence of the same sample.
Figure 5B:
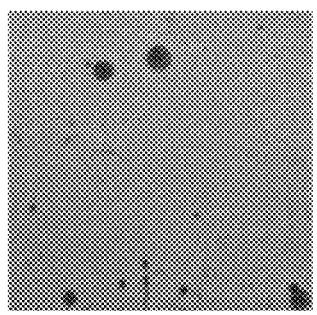
FIG. 5B is a diagram illustrating an enlarged image of the photoluminescence portion thereof.
Figure 5C:
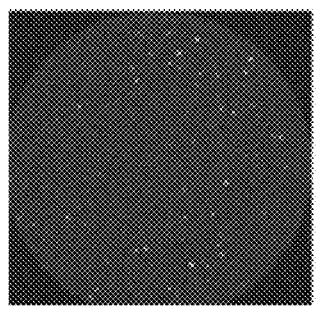
FIG. 5C is a diagram illustrating an image of the scattered light thereof.
Figure 5D:
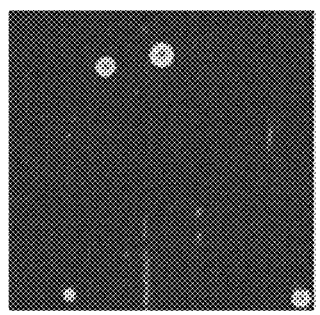
FIG. 5D is a diagram illustrating an enlarged image of the scattered light thereof.
Figure 5E:
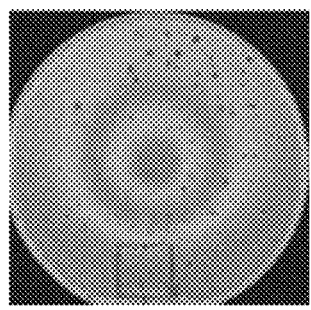
FIG. 5E is a diagram illustrating an image of the reflected light thereof.
Figure 5F:
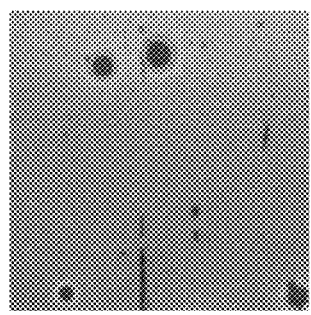
FIG. 5F is a diagram illustrating an enlarged image of the reflected light thereof.

FIG. 5A is a diagram illustrating an image of the photoluminescence of the same sample, FIG. 5B is a diagram illustrating an enlarged image of the photoluminescence portion thereof, FIG. 5C is a diagram illustrating an image of the scattered light thereof, FIG. 5D is a diagram illustrating an enlarged image of the scattered light thereof, FIG. 5E is a diagram illustrating an image of the reflected light thereof, and FIG. 5F is a diagram illustrating an enlarged image of the reflected light thereof. It can be seen that the image of the scattered light and the image of the reflected light simultaneously acquired while observing the mapping with the photoluminescence can enable the defect analysis to perform accurately and quickly.

As described above, while the present disclosure has been described in detail in connection with the exemplary embodiments of the present disclosure, the scope of the present disclosure is not limited thereto and various modified and improved forms of those skilled in the art using the basic concept of the present disclosure defined in the appended claims are also included in the scope of the present disclosure.

All technical terms used in the present disclosure are used as the meanings as being generally understood by those skilled in the relevant field of the present disclosure unless otherwise defined. The contents of all publications referred to the present specification are incorporated herein by reference.

DETAILED DESCRIPTION OF MAIN ELEMENTS

1: incident light (excitation light)
2: photoluminescence
3: scattered light
4: reflected light
5: incident light (non-excitation light)
10: light source (first light source)
11: circular parallel light
20: concentric slit
21: ring-shaped light
25: light source unit dichroic mirror
30: first beam splitter
40: objective lens
50: sample stage
60: second beam splitter
70: ring-shaped diaphragm
71: optical filter
75: inclined ring-shaped diaphragm
80: dichroic mirror
100: sample
200: image detector
300: scattered light detecting unit
310: scattered light filter
320: scattered light lens
400: photoluminescence detecting unit
410: photoluminescence filter
420: photoluminescence lens
500: reflected light detecting unit
510: reflected light filter
520: reflected light lens

The invention claimed is:

1. A defect inspection apparatus for simultaneously detecting photoluminescence and scattered light, the defect inspection apparatus comprising:
   a light source for emitting ring-shaped light;
   a first beam splitter positioned on the traveling path of the ring-shaped light to change the path in the perpendicular direction so that the light travels toward a sample, and for straightly passing through the photoluminescence, the scattered light, and the ring-shaped reflected light that have been generated from the sample;
   an objective lens for focusing the ring-shaped light whose path has been changed in the first beam splitter to transmit it to the sample, and transmitting the photoluminescence, the scattered light, and the ring-shaped reflected light that have been generated from the sample to the first beam splitter in parallel light;
   a stage where the ring-shaped light that is incident by being focused by the objective lens can be mapped with the sample;
   a second beam splitter for straightly passing through some of the photoluminescence, the scattered light, and the ring-shaped reflected light that have been generated from the sample and have passed through the objective lens and the first beam splitter and changing the paths of the remainder except for the passed-through some in the perpendicular direction;
   an image detector for imaging the photoluminescence, the scattered light, and the ring-shaped reflected light that have passed through the second beam splitter straightly;
   a ring-shaped diaphragm for blocking the ring-shaped reflected light that has passed through by changing the path in the perpendicular direction in the second beam splitter;
   a dichroic mirror for changing the path of the photoluminescence that has passed through the diaphragm in the perpendicular direction, and passing through the scattered light;
   a photoluminescence detecting unit for detecting the photoluminescence reflected by the dichroic mirror; and
   a scattered light detecting unit for detecting the scattered light that has passed through the dichroic mirror.

2. A defect inspection apparatus for simultaneously detecting photoluminescence and scattered light, the defect inspection apparatus comprising:
   a light source for emitting ring-shaped light;
   a first beam splitter positioned on the traveling path of the ring-shaped light to change the path in the perpendicular direction so that the light travels toward a sample, and for straightly passing through the photoluminescence, the scattered light, and the ring-shaped reflected light that have been generated from the sample;
   an objective lens for focusing the ring-shaped light whose path has been changed in the first beam splitter to transmit it to the sample, and transmitting the photoluminescence, the scattered light, and the ring-shaped reflected light that have been generated from the sample to the first beam splitter in the parallel light;
   a stage where the ring-shaped light that is incident by being focused by the objective lens can be mapped with the sample;
   a second beam splitter for straightly passing through some of the photoluminescence, the scattered light, and the ring-shaped reflected light that have been generated from the sample and have passed through the objective lens and the first beam splitter and changing the paths of the remainder except for the passed-through some in the perpendicular direction;
   an image detector for imaging the photoluminescence, the scattered light, and the ring-shaped reflected light that have passed through the second beam splitter straightly;
   an inclined ring-shaped diaphragm for reflecting the ring-shaped reflected light, which has passed through by changing the path in the perpendicular direction in the second beam splitter, in the perpendicular direction;
   a dichroic mirror for changing the path of the photoluminescence that has passed through the inclined ring-shaped diaphragm in the perpendicular direction, and passing through the scattered light;
   a reflected light detecting unit for detecting the reflected light reflected by the inclined ring-shaped diaphragm;
   a photoluminescence detecting unit for detecting the photoluminescence reflected by the dichroic mirror; and
   a scattered light detecting unit for detecting the scattered light that has passed through the dichroic mirror.

3. The defect inspection apparatus for simultaneously detecting the photoluminescence and the scattered light of claim 1,
   wherein the light source generates the ring-shaped light by passing the parallel light through a concentric slit.

4. A defect inspection apparatus for simultaneously detecting photoluminescence and scattered light, the defect inspection apparatus comprising:
   a first light source for transmitting photoluminescence excitation light to a light source unit dichroic mirror;
   a second light source for transmitting a ring-shaped non-excitation light to the light source unit dichroic mirror in the direction perpendicular to the first light source;
   the light source unit dichroic mirror for passing through the excitation light straightly, changing the non-excitation light in the perpendicular direction in order to travel in the same direction as that of the excitation light to generate the excitation light and the non-excitation light together and transmitting them to a first beam splitter;
   the first beam splitter positioned on the traveling paths of the excitation light and the non-excitation light that are traveling together to change the paths in the perpendicular direction so that the excitation light and the non-excitation light travel toward a sample, and for straightly passing through the photoluminescence, the scattered light, and the reflected light that have been generated from the excitation light in the sample and the scattered light and the ring-shaped reflected light that have been generated from the non-excitation light therein;
   an objective lens for focusing the excitation light and the non-excitation light whose paths have been changed in the first beam splitter to transmit them to the sample, and transmitting the photoluminescence, the scattered light, and the reflected light that have been generated from the excitation light in the sample and the scattered light and the ring-shaped reflected light that have been generated from the non-excitation light therein to the first beam splitter;
   a stage where the excitation light and the non-excitation light that are incident by being focused by the objective lens can be mapped with the sample;

a second beam splitter for straightly passing through some of the photoluminescence, the scattered light, and the reflected light that have been generated from the excitation light and the scattered light and the ring-shaped reflected light that have been generated from the non-excitation light, which have been generated from the sample and have passed through the objective lens and the first beam splitter, and changing the paths of the remainder except for the passed-through some in the perpendicular direction;

an image detector for imaging the photoluminescence, the scattered light, and the reflected light that have been generated from the excitation light and the scattered light and the ring-shaped reflected light that have been generated from the non-excitation light, which have passed through the second beam splitter straightly;

an optical filter for blocking the scattered light and the reflected light that have been generated from the excitation light and passing through the photoluminescence that has been generated from the excitation light and the scattered light and the ring-shaped reflected light that have been generated from the non-excitation light among the light having passed through by changing the path in the perpendicular direction in the second beam splitter;

an inclined ring-shaped diaphragm for reflecting the ring-shaped reflected light that has been generated from the non-excitation light having passed through the optical filter in the perpendicular direction;

a dichroic mirror for changing the path of the photoluminescence that has been generated from the excitation light in the perpendicular direction, and passing through the scattered light that has been generated from the non-excitation light, which have passed through the inclined ring-shaped diaphragm;

a reflected light detecting unit for detecting the ring-shaped reflected light that has been generated from the non-excitation light reflected by the inclined ring-shaped diaphragm;

a photoluminescence detecting unit for detecting the photoluminescence that has been generated from the excitation light reflected by the dichroic mirror; and a scattered light detecting unit for detecting the scattered light that has been generated from the excitation light having passed through the dichroic mirror.

5. The defect inspection apparatus for simultaneously detecting the photoluminescence and the scattered light of claim 2,
wherein the reflected light detecting unit comprises an optical filter, a lens, and a detector.

6. The defect inspection apparatus for simultaneously detecting the photoluminescence and the scattered light of claim 1,
wherein the photoluminescence detecting unit and the scattered light detecting unit comprise an optical filter and a detector, respectively.

7. The defect inspection apparatus for simultaneously detecting the photoluminescence and the scattered light of claim 4,
wherein the first beam splitter is a dichroic mirror.

8. The defect inspection apparatus for simultaneously detecting the photoluminescence and the scattered light of claim 1,
wherein the image detector further comprises an optical system for imaging an image.

9. The defect inspection apparatus for simultaneously detecting the photoluminescence and the scattered light of claim 4,
wherein the second light source generates the ring-shaped light by passing the parallel light through a concentric slit.

10. The defect inspection apparatus for simultaneously detecting the photoluminescence and the scattered light of claim 4,
wherein the excitation light is laser light having a wavelength of 375 nm,
wherein the non-excitation light is laser light having a wavelength of 532 nm, and
wherein the sample is a blue LED substrate.

11. The defect inspection apparatus for simultaneously detecting the photoluminescence and the scattered light of claim 2,
wherein the light source generates the ring-shaped light by passing the parallel light through a concentric slit.

12. The defect inspection apparatus for simultaneously detecting the photoluminescence and the scattered light of claim 4,
wherein the reflected light detecting unit comprises an optical filter, a lens, and a detector.

13. The defect inspection apparatus for simultaneously detecting the photoluminescence and the scattered light of claim 2,
wherein the photoluminescence detecting unit and the scattered light detecting unit comprise an optical filter and a detector, respectively.

14. The defect inspection apparatus for simultaneously detecting the photoluminescence and the scattered light of claim 4,
wherein the photoluminescence detecting unit and the scattered light detecting unit comprise an optical filter and a detector, respectively.

15. The defect inspection apparatus for simultaneously detecting the photoluminescence and the scattered light of claim 2,
wherein the image detector further comprises an optical system for imaging an image.

16. The defect inspection apparatus for simultaneously detecting the photoluminescence and the scattered light of claim 4,
wherein the image detector further comprises an optical system for imaging an image.

17. A method of defect inspection for simultaneously detecting photoluminescence and scattered light in a sample, the method comprising:
providing the apparatus of claim 1;
placing the sample on a stage of the apparatus;
emitting ring-shaped light from a light source;
changing the path of the ring-shaped light in the perpendicular direction so that the light travels toward a sample, using a first beam splitter positioned on the traveling path;
transmitting the ring-shaped light whose path has been changed in the first beam splitter using an objective lens for focusing the ring-shaped light;
mapping the ring-shaped light that is incident with the sample on the stage by being focused by the objective lens;
transmitting the photoluminescence, the scattered light, and the ring-shaped reflected light that have been generated from the sample to the first beam splitter in parallel light, using the objective lens;

passing straightly the photoluminescence, the scattered light, and the ring-shaped reflected light that have been generated from the sample through the first beam splitter;

passing straightly some of the photoluminescence, the scattered light, and the ring-shaped reflected light that have been generated from the sample and have passed through the objective lens and the first beam splitter through a second beam splitter, and changing the paths of the remainder except for the passed-through some in the perpendicular direction;

imaging the photoluminescence, the scattered light, and the ring-shaped reflected light that have passed through the second beam splitter straightly, using an image detector;

blocking the ring-shaped reflected light that has passed through by changing the path in the perpendicular direction in the second beam splitter, using a ring-shaped diaphragm;

changing the path of the photoluminescence that has passed through the diaphragm in the perpendicular direction using a dichroic mirror, and passing through the scattered light;

detecting the photoluminescence reflected by the dichroic mirror, using a photoluminescence detecting unit; and detecting the scattered light that has passed through the dichroic mirror, using a scattered light detecting unit.

18. The method of defect inspection for simultaneously detecting photoluminescence and scattered light of claim 17, wherein the light source generates the ring-shaped light by passing the parallel light through a concentric slit.

19. The method of defect inspection for simultaneously detecting photoluminescence and scattered light of claim 17, wherein the photoluminescence detecting unit and the scattered light detecting unit comprise an optical filter and a detector, respectively.

20. The method of defect inspection for simultaneously detecting photoluminescence and scattered light of claim 17, wherein the image detector further comprises an optical system for imaging an image.

* * * * *